US009031238B2

(12) United States Patent
Sarangdhar et al.

(10) Patent No.: US 9,031,238 B2
(45) Date of Patent: *May 12, 2015

(54) DATA ENCRYPTION AND/OR DECRYPTION BY INTEGRATED CIRCUIT

(71) Applicant: Intel Corporation, Santa Clara, CA (US)

(72) Inventors: Nitin Sarangdhar, Portland, OR (US); Ned Smith, Beaverton, OR (US); Vincent Von Bokern, Rescue, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/661,654

(22) Filed: Oct. 26, 2012

(65) Prior Publication Data

US 2013/0124876 A1     May 16, 2013

Related U.S. Application Data

(63) Continuation of application No. 12/164,663, filed on Jun. 30, 2008, now Pat. No. 8,300,825.

(51) Int. Cl.
| | | |
|---|---|---|
| *H04L 9/00* | (2006.01) | |
| *G06F 12/14* | (2006.01) | |
| *G06F 21/72* | (2013.01) | |
| *H04L 29/06* | (2006.01) | |
| *H04L 9/08* | (2006.01) | |

(52) U.S. Cl.
CPC ............ *G06F 12/1408* (2013.01); *G06F 21/72* (2013.01); *H04L 63/0428* (2013.01); *H04L 9/0833* (2013.01); *H04L 9/0897* (2013.01)

(58) Field of Classification Search
CPC . G06F 21/72; G06F 12/1408; G06F 12/1416; H04L 63/0428
See application file for complete search history.

(56) References Cited

U.S. PATENT DOCUMENTS

| | | |
|---|---|---|
| 7,418,598 B1 | 8/2008 | Le Quere |
| 8,300,825 B2 | 10/2012 | Sarangdhar et al. |
| 2003/0110382 A1* | 6/2003 | Leporini et al. ............. 713/172 |
| 2004/0091114 A1 | 5/2004 | Carter et al. |

(Continued)

OTHER PUBLICATIONS

Windows BitLocker Drive Encryption, http://www.microsoft.com/windows/products/windowsvista/features/details/bitlocker.mspx,(Jun. 27, 2008), 4 pgs.

(Continued)

*Primary Examiner* — David Le
(74) *Attorney, Agent, or Firm* — Christopher K. Gagne

(57) ABSTRACT

In an embodiment, an apparatus is provided that may include an integrated circuit to be removably communicatively coupled to at least one storage device. The integrated circuit of this embodiment may be capable of encrypting and/or and decrypting, based at least in part upon a first key, data to be, in at least in part, stored in and/or retrieved from, respectively, at least one region of the at least one storage device. The at least one region and a second key may be associated with at least one access privilege authorized, at least in part, by an administrator. The second key may be stored, at least in part, externally to the at least one storage device. The first key may be obtainable, at least in part, based, at least in part, upon at least one operation involving the second key. Of course, many alternatives, modifications, and variations are possible without departing from this embodiment.

21 Claims, 3 Drawing Sheets

(56) References Cited

U.S. PATENT DOCUMENTS

| | | | |
|---|---|---|---|
| 2005/0086471 | A1 | 4/2005 | Spencer et al. |
| 2005/0138374 | A1 | 6/2005 | Zheng et al. |
| 2007/0033320 | A1* | 2/2007 | Wu et al. ............. 711/100 |
| 2007/0255963 | A1* | 11/2007 | Pizano et al. ......... 713/189 |
| 2008/0015995 | A1* | 1/2008 | Chen ................. 705/50 |
| 2010/0217977 | A1* | 8/2010 | Goodwill et al. ...... 713/167 |
| 2011/0035574 | A1* | 2/2011 | Jevans et al. ......... 713/2 |

OTHER PUBLICATIONS

Microsoft, "Windows Vista™ Enterprise Centralized Desktop", Centralized Desktops Running Virtually on the Server, 2 pgs.

Intel, "The Intel Q965 Express Chipset—Product Brief", Advanced Capabilities for real business needs, 4 pgs.

Amazon.com: SanDisk 8 GB Cruzer Micro USB 2.0 Drive with U3 SDCZ6-8192-A11 (retail packaging): Electronics, http://www.amazon.com/SanDisk-Cruzer-SDCZ6-8192-A11-retail-paB000EWHEM6&pf_rd_m=ATVPDKIKX0DER&pf_rd_r=09AAVDTVTZFWQGD7CHNC,(Jun. 27, 2008), 6 pgs.

Microsoft, "Microsoft Desktop Optimization Pack for Software Assurance", Dynamic Desktop Solutions, 2 pgs.

"Disk Encryption Forum", USB Flash Drive Protection, (Mar. 12, 2007), 21 pgs.

Hins, Matt "Intel adds encryption to vPro", The Balanced WareHouse Video, (Dec. 10, 2007), 2 pgs.

Intel, Intel Developer Forum, (Aug. 2007), 21 pgs.

"Intel® Matrix Storage Technology", http://www.intel.com/design/chipsets/matrixstorage_sb.htm, (May 14, 2008), 5 pgs.

Microsoft, "Microsoft® Enterprise Desktop Virtualization", 2 pgs.

Smith, Tony "The Register", Next-gen Intel vPro platform to get hardware encryption, http://www.theregister.co.uk/2007/09/21/intel_vpro_danbury/print.html (May 14, 2008),(Jul. 21, 2007), 3 pgs.

Microsoft, "Virtual Server 2005 R2", Windows VistaÃ?? Enterprise Centralized Desktop and Virtual Server 2005 R2, (Apr. 2007),17 pgs.

\* cited by examiner

DATA ENCRYPTION AND/OR DECRYPTION BY INTEGRATED CIRCUIT

FIELD

This disclosure relates to data encryption and/or decryption by an integrated circuit.

BACKGROUND

In one conventional removable storage technique, a flash memory storage device is removably coupled to a host computer via a communication port. The storage device includes special internal circuitry that encrypts and decrypts data stored to and retrieved from the device by the host computer. The storage device's internal circuitry prohibits access to the encrypted data in the device unless the user of the host computer provides the user's password. Unfortunately, this conventional technique cannot be implemented using a storage device that does not include such specialized internal circuitry, and the use of such specialized circuitry undesirably increases the cost and complexity of the storage device.

In another conventional technique, software executing in the host computer and host OS encrypts and decrypts the data. Since the encryption is performed in host OS software the keys used for encryption are easily visible to all other software which includes malware running on the platform. Thus the malware can easily obtain the keys during runtime and can use them in turn to break into the encrypted data stored on the removable flash storage device.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
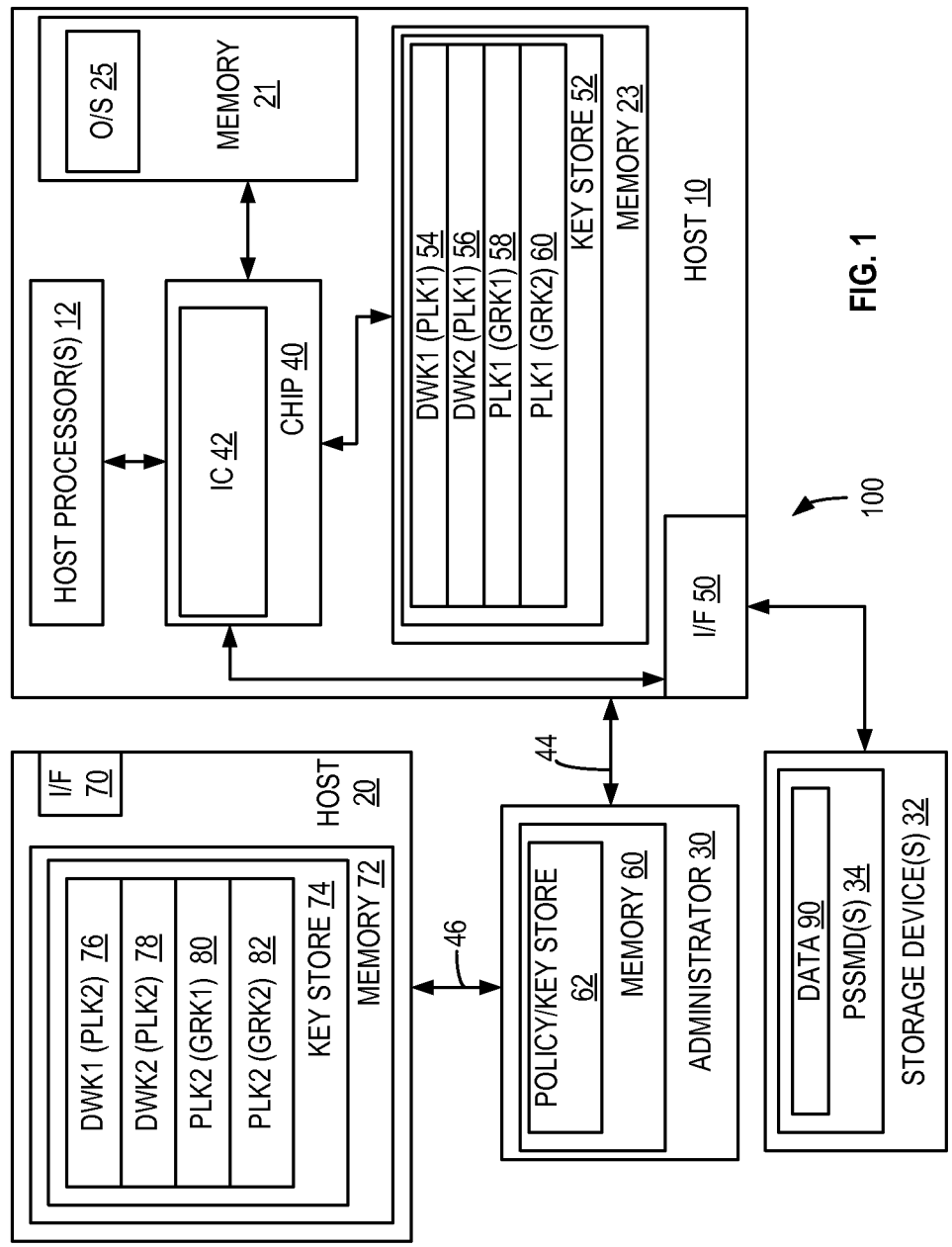
FIG. 1 illustrates a system embodiment.

FIG. 1 illustrates a system embodiment 100. System 100 may include one or more administrators 30 that may be communicatively coupled via one or more respective sets 44 and 46 of communication links to one or more, and in this embodiment, a plurality of hosts 10 and 20. The construction and operation of each host 10 and 20 may be substantially identical, although the respective construction and/or operation of hosts 10 and 20 may differ, in whole or in part. One or more administrators 30 may comprise one or more hosts and/or servers capable of carrying out secure communications with hosts 10 and 20 via links 44 and 46.

Host 10 may comprise one or more host processors 12. Each of the host processors 12 may be coupled (e.g., via not shown interconnect) to a chipset (such as integrated circuit chip 40). Each of processors 12 may comprise a respective Intel® microprocessor commercially available from the Assignee of the subject application. As used herein, a "processor" means circuitry capable of performing, at least in part, one or more arithmetic and/or logical operations. As used herein, "circuitry" may comprise singly or in any combination, analog circuitry, digital circuitry, hardwired circuitry, programmable circuitry, state machine circuitry, and/or memory that may comprise program instructions that may be executed by programmable circuitry. Additionally, as used herein, first device may be "communicatively coupled" to a second device if the first device is capable of transmitting to and/or receiving from the second device one or more signals. Alternatively, each of the host processors 12 may comprise a respective microprocessor that is manufactured and/or commercially available from a source other than the Assignee of the subject application.

The one or more integrated circuits 42 may constitute a single integrated circuit (and will be referred to as such hereinafter) that may be comprised in a single integrated circuit chip 40. As used herein, an "integrated circuit" means a semiconductor device and/or microelectronic device, such as a semiconductor integrated circuit chip.

Host 10 also may comprise computer-readable system memory 21 and computer-readable memory 23 that may be communicatively coupled to integrated circuit 42. As used herein, "memory" may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable memory.

Host 10 may include interface 50 that is communicatively coupled to integrated circuit 42. Interface 50 may be compatible with the Universal Serial Bus Specification Revision 2.0, published Apr. 27, 2000, copyright 2000, Compaq Computer Corporation, et al. (hereinafter referred to as the "USB protocol"). One or more storage devices 32 may comprise USB protocol compatible interface 300 (see FIG. 3) that may be electrically and physically mated with interface 50. When interface 300 is so electrically and physically mated with interface 50, one or more storage devices 32 (and/or other components thereof) may be capable of exchanging data and/or commands with integrated circuit 42 in accordance with the USB protocol.

One or more storage devices 32 may comprise one or more portable solid state memory devices 34. Although one or more storage devices 32 will be referred to in the singular, it should be understood that it may comprise a plurality of storage devices. Likewise, although one or more portable solid state memory devices 34 will be referred to in the singular, it should be understood that it may comprise a plurality of portable solid state memory devices. Portable solid state memory device 34 may be or comprise, e.g., a flash memory device. Alternatively or additionally, device 34 may comprise one or more optical and/or magnetic storage devices (e.g., one or more hard disk drives).

Administrator 30 may comprise computer-readable memory 60. Host 20 may comprise computer-readable memory 72 whose construction and operation in host 20 may be substantially analogous to the construction and operation of memory 23 in host 10. Host 20 also may comprise interface 70 whose construction and operation in host 20 may be substantially analogous to the construction and operation of interface 50 in host 10.

One or more links 44 and/or 46 may permit the exchange data and/or commands between host 10 and administrator 30, and between host 20 and administrator 30, respectively, in accordance with, e.g., one or more communication protocols, such as, an Ethernet protocol and/or Transmission Control Protocol/Internet Protocol (TCP/IP) protocol. The Ethernet protocol utilized in one or more links 44 and/or 46 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in one or more links 44 and/or 46 may comply or be compatible with the protocols described in Internet Engineering Task Force (IETF) Request For Comments (RFC) 791 and 793, published September 1981. Such protocol or protocols may comprise one or more wireless protocols, such as, Institute of Electrical and Electronics Engineers (IEEE) 802.11-1999: Wireless LAN Medium Access Control (MAC) and Physical Layer (PHY) Specifications, IEEE Working Group (1999-07-15), published 1999, IEEE, Inc., and/or other wireless protocols. Additionally or alternatively, such protocol or protocols may comprise The Transport Layer Security (TLS) Protocol Version 1.1, IETF RFC 4346, published April 2006, Extensible Authentication Protocol, IETF RFC 3748, published June 2004, and/or other and/or additional security, authentication, and/or cryptographic protocols.

Machine-readable program instructions may be stored in memory 21, 23, 60, and/or 72, and in not shown respective system memories in host 20 and administrator 30. The one or more instructions in memory 21 may be executed by the one or more host processors 12, and the one or more instructions in memory 23 may be executed by integrated circuit 42, respectively. When so executed, this may result in one or more host processors 12, integrated circuit 42, and/or other components of host 10 performing the operations described herein as being performed by these components of system 100.

The one or more instructions in not shown system memory in host 20 may be executed by the one or more not shown host processors in host 20, and the one or more instructions in memory 72 may be executed by a not shown integrated circuit in host 20, respectively. When so executed, this may result in the not shown one or more host processors, integrated circuit, and/or other components of host 20 performing the operations described herein as being performed by these components of system 100.

The one or more instructions in not shown system memory in administrator 30 may be executed by the one or more not shown host processors in administrator 30, and the one or more instructions in memory 60 may be executed by a not shown integrated circuit in administrator 30, respectively. When so executed, this may result in the not shown one or more host processors, integrated circuit, and/or other components of administrator 30 performing the operations described herein as being performed by these components of system 100.

Figure 2:
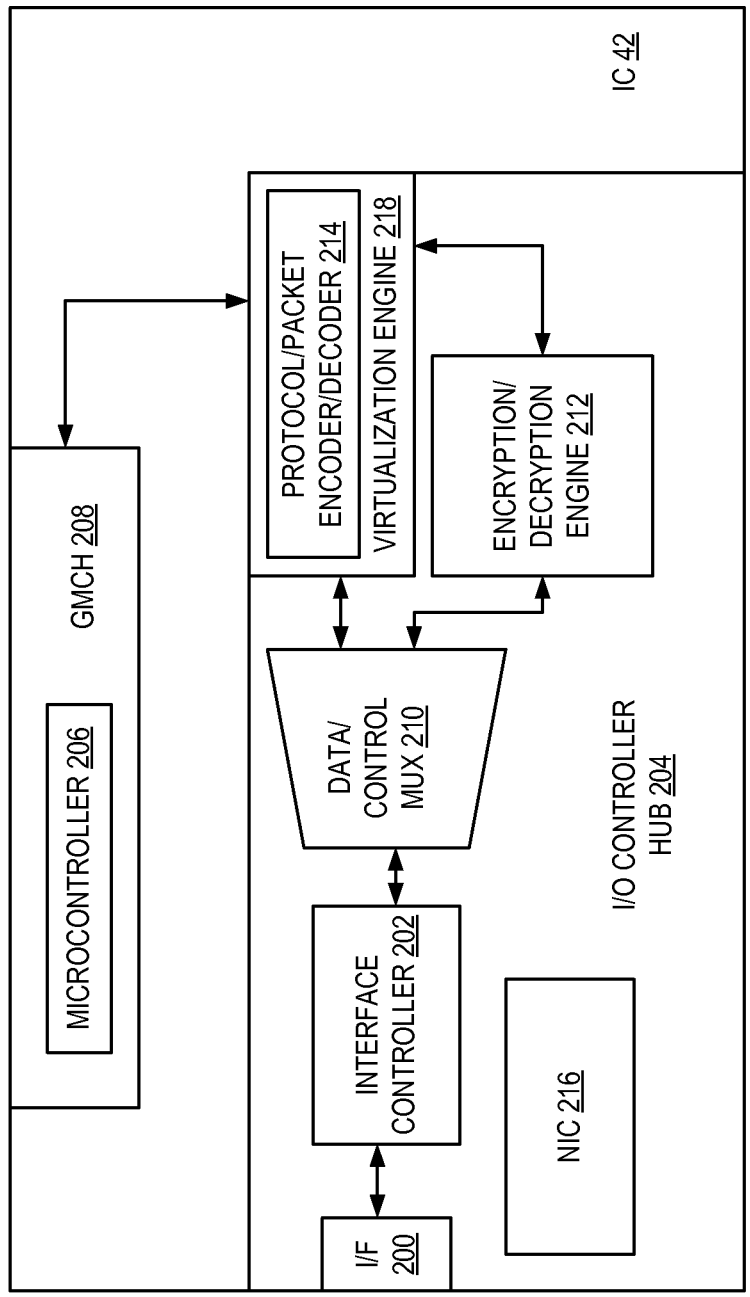
FIG. 2 illustrates an integrated circuit in an embodiment.

FIG. 2 illustrates an embodiment of integrated circuit 42. Integrated circuit 42 may comprise graphics and memory controller hub (GMCH) 208 that may couple one or more host processors 12, system memory 21 and a not shown user interface system to each other and to the not shown interconnect. The not shown user interface system may comprise, e.g., a keyboard, pointing device, and display system that may permit a human user to input commands to, and monitor the operation of, host 10 and/or system 100. GMCH 208 may comprise microcontroller 206.

Integrated circuit 42 also may comprise input/output (I/O) controller hub 204 that is communicatively coupled to GMCH 208. Hub 204 may comprise interface 200 that may be communicatively coupled to interface controller 202. Hub 204 also may comprise data/command multiplexer 210 that may be communicatively coupled to controller 202, virtualization engine 218, and encryption/decryption engine 212. Engine 212 also may be communicatively coupled to virtualization engine 218. Engine 218 may comprise protocol/packet encoder/decoder 214.

Interface 200 may be communicatively coupled to interface 50. Storage device 32 and interface 50 may be constructed to permit device 32 to be removably communicatively coupled to interface 50 via interface 300, thereby also resulting in storage device 32 being able to be removably communicatively coupled to interface 200 (i.e., via interface 50) of integrated circuit 42. When storage device 32 is removably coupled to interface 50 via interface 300, microcontroller 206 may exchange data and/or commands with storage device 32 and/or memory device 34 via protocol encoder/decoder 214, encryption/decryption engine 212, multiplexer 210, interface controller 202, interface 200, and interface 50. Multiplexer 210 may multiplex data and commands thus exchanged between microcontroller 206 and storage device 32 and/or memory device 34, such that data are exchanged pass through encryption/decryption engine 212, but exchanged commands by-pass encryption/decryption engine 212.

Hub 204 may comprise network interface controller (NIC) 216 that may permit hub 204 to be communicatively coupled via one or more links 44 to administrator 30. That is, NIC 216 may be capable of exchanging data and/or commands with administrator 30 via one or more links 44 based upon, at least in part, commands and/or data provided to NIC 216 by administrator 30 (e.g., via one or more links 44), GMCH 208, microcontroller 206, one or more host processor 12, and/or other components of hub 204. This may permit GMCH 208, microcontroller 206, one or more host processors 12, and/or other components of hub 204 to exchange data and/or commands with administrator 30 via NIC 216 and one or more links 44.

Alternatively, although not shown in the Figures, integrated circuit chip 40 may comprise a plurality of integrated circuit chips, with components of one or more integrated circuits 42 being comprised in the plurality of integrated circuit chips. GMCH 208 and/or microcontroller 206 may be comprised in one or more integrated circuit chips, and/or I/O controller hub 204 and/or various of the components of I/O controller hub 204 may be comprised in one or more other integrated circuit chips. Further alternatively, some or all of the components of one or more integrated circuits 42 may be comprised in one or more host processors 12.

Figure 3:
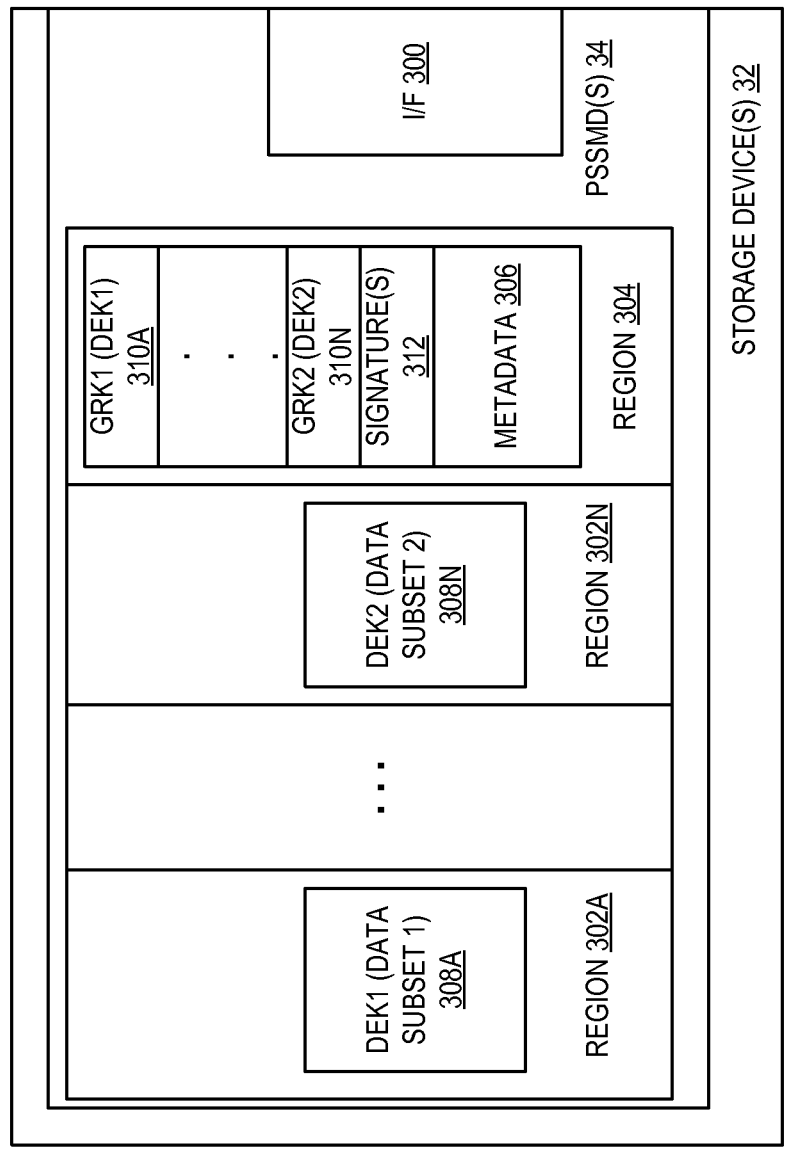
FIG. 3 illustrates at least one storage device in an embodiment.

With reference now being made to FIGS. 1 to 3, operations that may be performed in system 100 will be described. After, a reset of system 100, administrator 30, and/or host 10, a human user (not shown) of host 10 may attempt to use (e.g., via the not shown user interface of host 10) host 10. This may result in microcontroller 206 requesting (e.g., the not shown user interface) that the human user log into and thereby authenticate himself or herself to the host 10 and to the administrator 30. In response, the human user may provide one or more passwords and/or other secret credentials to the microcontroller 206. Microcontroller 206 may compare these one or more passwords and/or other secret credentials to one or more passwords and/or secret credentials issued from and authorized by the administrator 30 that were previously stored in the memory 23 to determine whether a match exists, and also may provide at least a subset of user-provided one or more passwords and/or secret credentials to the administrator 30. The administrator 30 may compare one or more passwords and/or secret credentials provided from the microcontroller 206 to one or more previously authorized passwords and/or other credentials stored in memory 60 to determine whether a match exists. If these comparisons by the microcontroller 206 and the administrator 30 result in the microcontroller 206 and administrator 30 determining that such matches exist, the microcontroller 206 and administrator 30 may determine that the user is authenticated and authorized to use the host 10. Thereafter, the administrator 30 and/or microcontroller 206 may generate (a result of, e.g., one or more predetermined cryptographic operations involving a unique identification code assigned to the microcontroller 206 and one or more of the passwords and/or secret credentials previously authorized by and associated with the user by the administrator 30 and/or provided by the user) a device wrap key (referred to in FIG. 1 as "DWK1") associated with host 10 by administrator 30. Conversely, if the microcontroller 206 and/or administrator 30 determine that such match does not exist, the administrator 30 and/or microcontroller 206 may determine that the user has not been authenticated and is not authorized.

Alternatively or additionally, microcontroller 206 may perform one or more predetermined cryptographic operations on at least a subset of the user-provided one or more passwords, secret credentials, and/or the unique identification code, and may compare these results to corresponding cryptographically generated values previously stored in memory 23 to authenticate the user. Further alternatively or additionally, after the user has supplied the one or more requested passwords and/or credentials to the microcontroller 206, the microcontroller 206 may perform these one or more predetermined cryptographic operations on the unique identification code and one or more of the user-supplied passwords and/or credentials, and transmit the resulting value to the administrator 30. The administrator 30 may perform these one or more predetermined cryptographic operations on the unique identification code (which may have been previously stored in memory 60) and one or more passwords and/or credentials that have been previously assigned to the user and authorized by the administrator 30, and may compare the resulting value with the value transmitted to the administrator 30 from the microcontroller 206 for a match. If the two values match, the administrator 30 may indicate that the user and the host 10 have been authenticated and authorized by the administrator 30. If the two values do not match, the administrator 30 may indicate that the host 10 and/or user have not been authenticated and are not authorized. If the user and the host 10 are authenticated and authorized by the administrator 30, the host 10 may use the transmitted value as device wrap key DWK1.

Memory 23 and microcontroller 206 may not be accessible to or controllable by the one or more host processors 12 and an operating system (OS) 25 that may be executed in host 10 by one or more processors 12. This may permit microcontroller 206 to act independently of the one or more processors 12 and operating system 25, in a manner that aids in enhancing and enforcing security of and within host 10, storage device 32, and system 100.

Administrator 30 may maintain and store in memory 60 a policy/key store 62 that may associate keys that have been authorized by administrator 30 with users, groups, and/or platforms (and related access privileges) in system 100 that have been authorized by administrator 30. Administrator 30 may authorize platforms (e.g., host 10 and/or 20), users, and/or groups of users in system 100. In store 62, administrator 30 may associate these authorized platforms and user groups with respective platform keys and group keys. Store 62 also may associate these keys with the users authorized to use and assigned to them, as well as, the access privileges and policies authorized and assigned to the keys, users, groups of users, and platforms by the administrator 30. Store 62 may indicate that a first user group may be authorized and assigned to use group key GRK1, and hosts 10 and 20. Store 62 also may indicate that hosts 10 and 20 may be authorized and assigned to use platform keys PLK1 and PLK2, respectively. Store 62 may indicate that a second user group may be authorized and assigned to use group key GRK2, and hosts 10 and 20. However, store 62 may indicate that different access privileges have been assigned to these user groups such that each respective user group may only access a respective subset of user data associated with that respective user group. As is discussed below, store 62 may indicate that only users associated with the first user group assigned group key GRK1 may access a subset 308A of user data 90 stored in device 34, and also may indicate that only users associated with the second user group assigned group key GRK2 may access another subset 308N of user data 90.

In host 10, as a result of a previous initialization operation involving microcontroller 206 and administrator 30, microcontroller 206 may have previously stored in memory 23 key store 52. Key store 52 may comprise encrypted keys 54, 56, 58, and 60. Encrypted key 54 may be platform key PLK1 encrypted by device wrap key DWK1. Encrypted key 56 may be platform key PLK1 encrypted by another device wrap key DWK2 (generated and associated with host 20 in a manner similar to that described above in relation to device wrap key DWK1 associated with host 10). Encrypted key 58 may be group key GRK1 encrypted by platform key PLK1. Encrypted key 60 may be group key GRK2 encrypted by platform key PLK1.

Likewise, in host 20, as a result of a previous initialization operation involving the not shown microcontroller in host 20 and administrator 30, the not shown microcontroller may have previously stored in memory 72 key store 74. Key store 74 may comprise encrypted keys 76, 78, 80, and 82. Encrypted key 76 may be platform key PLK2 encrypted by device wrap key DWK1. Encrypted key 78 may be platform key PLK2 encrypted by device wrap key DWK2. Encrypted key 80 may be group key GRK1 encrypted by platform key PLK2. Encrypted key 82 may be group key GRK2 encrypted by platform key PLK2.

The group keys and platform keys may be generated, at least in part, using pseudorandom and/or true random number generators seeded by a true random number generator. The sizes of these keys may be variable so as to meaningful to modes compatible with Advanced Encryption Standard, Federal Information Processing Standard Publication 197, published by National Institute of Standards and Technology, Nov. 26, 2001.

Each host's platform key may be generated at the respective host, stored in administrator 30 (and/or a not shown key storage server) and thereafter may be provisioned to respective host. Alternatively, each host's platform key may be generated by administrator 30 (and/or the key storage server), and thereafter, may be provisioned to the respective host.

After the human user and host 10 have been authenticated and authorized by administrator 30, the human user of host 10 may insert storage device 32 into interface 50. This may result in storage device 32 becoming removably communicatively coupled to interface 50, and thereby, also to interface 200 of integrated circuit 42.

In response, at least in part, to the insertion of the storage device 32 into interface 50, interface controller 202, encoder/decoder 214, and/or other and/or additional components of hub 204 may discover that storage device and/or memory device 34 are compatible and/or compliant with the USB protocol, may identify the storage device 32 and/or memory device 34 as constituting storage and/or memory devices, respectively, and may indicate same to microcontroller 206. Microcontroller 206 may issue commands to storage device 32 and/or memory device 34 that may request that some or all of metadata 306 stored in region 304 of memory device 34 be accessed. In this embodiment, a "region" of a memory device or storage device may comprise one or more contiguous and/or non-contiguous locations in the memory device or storage device. Also in this embodiment, "accessing" a memory device or a storage device may comprise reading and/or writing.

As a result, at least in part, of the request from microcontroller 206, one or more signatures 312 comprised in metadata 306 may be read by microcontroller 206. One or more signatures 312 may indicate that storage device 32 and/or memory device 34 have been authorized by the administrator 30 for use in system 100.

Metadata 306 and/or region 304 may located in one or more predetermined logical block address ranges of memory device 34 that are inaccessible to one or more host processors 12 and/or operating system 25. In host 10, attempts by one or more host processors 12 and/or operating system 25 to access these one or more predetermined logical block address ranges may be intercepted and blocked by microcontroller 206.

After determining, based at least in part, upon one or more signatures 312 that storage device 32 and/or memory device 34 have been authorized for use by administrator 30, microcontroller 206 may read encrypted keys 310A . . . 310N stored in metadata 306. Each encrypted key 310A . . . 310N may be a respective device encryption key encrypted by a respective group key authorized by administrator 30. Encrypted key 310A may be device encryption key DEK1 encrypted by group key GRK 1, and encrypted key 310N may be device encryption key DEK2 encrypted by group key GRK2.

If the user of host 10 is associated with the user group that has been assigned group key GRK1, microcontroller 206 may decrypt encrypted device encryption key DEK1 (encrypted key 310A), based at least in part, upon one or more cryptographic operations based, at least in part, upon group key GRK1. Prior to this, microcontroller 206 may decrypt encrypted group key GRK1 (encrypted key 58), based at least in part, upon one or more cryptographic operations based, at least in part, upon platform key PLK1. Prior to this, microcontroller 206 may decrypt encrypted platform key PLK1 (encrypted key 54 or 56) based at least in part, upon one or more cryptographic operations based at least in part upon device wrap key DWK1 or DWK2.

Conversely, if the user of host 10 is associated with the user group that has been assigned group key GRK2, microcontroller 206 may decrypt encrypted device encryption key DEK2 (encrypted key 310N), based at least in part, upon one or more cryptographic operations based, at least in part, upon group key GRK2. Prior to this, microcontroller 206 may decrypt encrypted group key GRK2 (encrypted key 58), based at least in part, upon one or more cryptographic operations based, at least in part, upon platform key PLK1.

Thereafter, the user of host 10 may issue a request to microcontroller 206 to access one or more subsets 308A . . . 308N of the data 90 stored in storage device 32. Each of the subsets 308A . . . 308N may be stored in a respective region 302A . . . 302N in the storage device 32 and/or memory device and may be associated with a respective user group that has been granted access privileges to that respective region and subset. Thus, subset 308A may be associated with the user group that has been assigned group key GRK1 and with the access privileges associated with that user group. Thus, only those users who may be associated with the user group that has been assigned group key GRK 1 may access subset 308A and region 302A. Also, subset 308N may be associated with the user group that has been assigned group key GRK2 and with the access privileges associated with that user group. Thus, only those users who may be associated with the user group that has been assigned group key GRK 2 may access subset 308N and region 302N.

As stored in device 34, subset 308A in region 302A may be encrypted by device encryption key DEK1, and subset 308N in region 302N may be encrypted by device encryption key DEK2, respectively. Accordingly, if the user is associated with the user group that has been assigned group key GRK2, microcontroller 206 may not decrypt encrypted device encryption key DEK1; likewise, if the user is associated with the user group that has been assigned group key GRK1, microcontroller 206 may not decrypt encrypted device encryption key DEK2. This may be done to enforce and preserve the respective access privileges assigned to these two user groups by administrator 30.

If the user of host 10 is associated with the user group assigned to group key GRK1, and the user requests the reading of subset 308A, subset 308A may be read from region 302A by interface controller 202 and decrypted for use by the user by engine 212 based, at least in part, upon one or more cryptographic operations involving device encryption key DEK1. Likewise, if the user is associated with user group assigned to group key GRK1, and the user requests the writing of data to region 302A, the data to be written to region 302A may be encrypted by engine 212 based, at least in part, upon one or more cryptographic operations involving device encryption key DEK1, and may be written to region 302A by interface controller 202.

Conversely, if the user of host 10 is associated with the user group assigned to group key GRK2, and the user requests the reading of subset 308N, subset 308N may be read from region 302N by interface controller 202 and decrypted for use by the user by engine 212 based, at least in part, upon one or more cryptographic operations involving device encryption key DEK2. Likewise, if the user is associated with user group assigned to group key GRK2, and the user requests the writing of data to region 302N, the data to be written to region 302N may be encrypted by engine 212 based, at least in part, upon one or more cryptographic operations involving device encryption key DEK2, and may be written to region 302N by interface controller 202.

Further conversely, if the storage device 32 is inserted into interface 70 of host 20, a user of host 20 may be able, if authenticated and authorized by administrator 30, in accordance with the foregoing, to access one or more subsets 308A . . . 308N. As stated previously, the construction and operation of host 20 may be substantially identical to the construction and operation of host 10. Accordingly, after determining, based at least in part, upon one or more signatures 312 that storage device 32 and/or memory device 34 have been authorized for use by administrator 30, the not shown microcontroller in host 20 may read encrypted keys 310A . . . 310N stored in metadata 306. If the user of host 20 is associated with the user group that has been assigned group key GRK1, the not shown microcontroller in host 20 may decrypt encrypted device encryption key DEK1 (encrypted key 310A), based at least in part, upon one or more cryptographic operations based, at least in part, upon group key GRK1. Prior to this, the not shown microcontroller may decrypt encrypted group key GRK1 (encrypted key 80), based at least in part, upon one or more cryptographic operations based, at least in part, upon platform key PLK2. Platform key PLK2 may have been previously decrypted by the not shown microcontroller based at least in part upon encrypted key 76 or 78 based, at least in part, upon one or more cryptographic operations based at least in part upon device wrap key DWK1 or DWK2.

Conversely, if the user of host 20 is associated with the user group that has been assigned group key GRK2, the not shown microcontroller in host 20 may decrypt encrypted device encryption key DEK2 (encrypted key 310N), based at least in part, upon one or more cryptographic operations based, at least in part, upon group key GRK2. Prior to this, the not shown microcontroller may decrypt encrypted group key GRK2 (encrypted key 82), based at least in part, upon one or more cryptographic operations based, at least in part, upon platform key PLK2.

Thereafter, the user of host 20 may issue a request to the not shown microcontroller to access one or more subsets 308A . . . 308N of the data 90 stored in storage device 32. If the user of host 20 is associated with the user group assigned to group key GRK1, and the user requests the reading of subset 308A, subset 308A may be read from region 302A by the not shown interface controller in host 20 and decrypted for use by the user by the not shown encryption/decryption engine in host 20 based, at least in part, upon one or more cryptographic operations involving device encryption key DEK1. Likewise, if the user is associated with user group assigned to group key GRK1, and the user requests the writing of data to region 302A, the data to be written to region 302A may be encrypted by the not shown encryption/decryption engine based, at least in part, upon one or more cryptographic operations involving device encryption key DEK1, and may be written to region 302A by the not shown interface controller in host 20.

Conversely, if the user of host 20 is associated with the user group assigned to group key GRK2, and the user requests the reading of subset 308N, subset 308N may be read from region 302N by the not shown interface controller in host 20 and decrypted for use by the user by the not shown encryption/decryption engine based, at least in part, upon one or more cryptographic operations involving device encryption key DEK2. Likewise, if the user is associated with user group assigned to group key GRK2, and the user requests the writing of data to region 302N, the data to be written to region 302N may be encrypted by the not shown encryption/decryption engine based, at least in part, upon one or more cryptographic operations involving device encryption key DEK2, and may be written to region 302N by the not shown interface controller.

Thus, an embodiment is provided that may include an integrated circuit to be removably communicatively coupled to at least one storage device. The integrated circuit of this embodiment may be capable of encrypting and/or and decrypting, based at least in part upon a first key, data to be, in at least in part, stored in and/or retrieved from, respectively, at least one region of the at least one storage device. The at least one region and a second key may be associated with at least one access privilege authorized, at least in part, by an administrator. The second key may be stored, at least in part, externally to the at least one storage device. The first key may be obtainable, at least in part, based, at least in part, upon at least one operation involving the second key.

In the apparatus of this embodiment, the at least one storage device is not required to include specialized internal circuitry of the type used in the prior art. Advantageously, this may permit the cost and complexity of the apparatus of this embodiment to be reduced compared to the prior art.

Also in this embodiment, data security, encryption, and decryption services may be provided, at least in part, by integrated circuit 42 comprised in a host. Advantageously, this reduces the amount of connection bandwidth and other network resources consumed in carrying out these services, improves the speed with which encryption and decryption may be carried out, and reduces latency in operations involving the at least one storage device in the apparatus of this embodiment compared to the prior art. Further advantageously, provision is made in this embodiment to permit users' respective data to be securely stored in the device, with such security being made on individual user and/or user group basis. The above and other features of this embodiment permit data security to be improved compared to the prior art.

The terms and expressions employed herein are used as terms of description and not of limitation, and there is no intention, in the use of such terms and expressions, of excluding any equivalents of the features shown and described (or portions thereof), and various modifications are possible. For example, some or all of the functionality of administrator 30 may be comprised in host 10 and/or host 20; such that it may be possible to perform at host 10 and/or host 20, some or all of the operations previously described herein as being performed at administrator 30, thereby making it possible to eliminate administrator 30 and links 44 and 46. Further alternatively, encrypted keys 76 and/or 56 may not be present in host 20 and/or host 10, respectively.

What is claimed is:

1. An apparatus comprising:
a host comprising at least one host system memory comprising flash memory and magnetic disk memory, the host to store a key store, the key store to store keys to be used to facilitate encryption of respective memory regions associated with the host; and
the keys comprising at least one key to be used to facilitate encryption of at least one region of at least one device that is capable of being removably communicatively coupled to the host, the at least one device comprising at least one portable device that comprises at least one hard disk drive.

2. The apparatus of claim 1, wherein:
the at least one portable device comprises another flash memory; and
the host comprises at least one universal serial bus interface to permit the at least one portable device to be removably communicatively coupled to the host.

3. The apparatus of claim 1, wherein:
the host comprises at least one interface to permit the at least one portable device to be removably communicatively coupled to the host.

4. A method comprising:
using keys to facilitate encryption of respective memory regions associated with a host, the host comprising at least one host system memory comprising flash memory and magnetic disk memory, the keys being stored in a key store in the host, the keys comprising at least one key to be used to facilitate encryption of at least one region of at least one device that is capable of being removably communicatively coupled to the host, the at least one device comprising at least one portable device that comprises at least one hard disk drive.

5. The method of claim 4, wherein:
the at least one portable device comprises another flash memory; and
the host comprises at least one universal serial bus interface to permit the at least one portable device to be removably communicatively coupled to the host.

6. The method of claim 4, wherein:
the host comprises at least one interface to permit the at least one portable device to be removably communicatively coupled to the host.

7. Computer-readable memory storing machine-readable program instructions that when executed by a machine result in operations comprising:
using keys to facilitate encryption of respective memory regions associated with a host, the host comprising at least one host system memory comprising flash memory and magnetic disk memory, the keys being stored in a key store in the host, the keys comprising at least one key to be used to facilitate encryption of at least one region of at least one device that is capable of being removably communicatively coupled to the host, the at least one device comprising at least one portable device that comprises at least one hard disk drive.

8. The computer-readable memory of claim 7, wherein:
the at least one portable device comprises another flash memory; and
the host comprises at least one universal serial bus interface to permit the at least one portable device to be removably communicatively coupled to the host.

9. The computer-readable memory of claim 7, wherein:
the host comprises at least one interface to permit the at least one portable device to be removably communicatively coupled to the host.

10. Computer-readable memory storing machine-readable program instructions that when executed by a machine result in operations comprising:
encryption, based at least in part upon one or more keys, of respective memory regions associated with a host, the host comprising at least one host system memory comprising flash memory and magnetic disk memory, the one or more keys being stored in a key store in the host, the keys comprising at least one key to be used to facilitate encryption of at least one region of at least one device that is capable of being removably communicatively coupled to the host, the at least one device comprising at least one portable device that comprises at least one hard disk drive.

11. The computer-readable memory of claim 10, wherein:
the at least one portable device comprises another flash memory; and
the host comprises at least one universal serial bus interface to permit the at least one portable device to be removably communicatively coupled to the host.

12. The computer-readable memory of claim 10, wherein:
the host comprises at least one interface to permit the at least one portable device to be removably communicatively coupled to the host.

13. An apparatus comprising:
at least one integrated circuit to be comprised in a host that comprises magnetic disk memory and at least one host processor, the at least one integrated circuit comprising a controller to be used to facilitate encryption of data to be stored in flash memory in the host, the encryption to be based at least in part upon at least one key and a user supplied password, the user supplied password to be supplied after a reset of the host; and
the encryption to be carried out independently of the at least one host processor.

14. The apparatus of claim 13, wherein:
the controller comprises a microcontroller and an encryption engine to carry out the encryption; and
the controller is communicatively coupled to the flash memory.

15. The apparatus of claim 13, wherein:
the at least one device comprises a portable device that comprises another disk memory; and
the host comprises an interface to permit the portable device to be removably communicatively coupled to the host.

16. A method comprising:
using a controller to facilitate encryption of data to be stored in flash memory in a host, the controller being comprised in at least one integrated circuit to be comprised in a host, the host comprising disk memory and at least one host processor, the encryption to be based at least in part upon at least one key and a user supplied password, the user supplied password to be supplied after a reset of the host; and
the encryption to be carried out independently of the at least one host processor.

17. The method of claim 16, wherein:
the controller comprises a microcontroller and an encryption engine to carry out the encryption; and
the controller is communicatively coupled to the flash memory.

18. The method of claim 16, wherein:
the at least one device comprises a portable device that comprises another disk memory; and
the host comprises an interface to permit the portable device to be removably communicatively coupled to the host.

19. Computer-readable memory storing machine-readable program instructions that when executed by a machine result in operations comprising:
using a controller to facilitate encryption of data to be stored in flash memory in a host, the controller being comprised in at least one integrated circuit to be comprised in a host, the host comprising disk memory and at least one host processor, the encryption to be based at least in part upon at least one key and a user supplied password, the user supplied password to be supplied after a reset of the host; and
the encryption to be carried out independently of the at least one host processor.

20. The computer-readable memory of claim 19, wherein:
the controller comprises a microcontroller and an encryption engine to carry out the encryption; and
the controller is communicatively coupled to the flash memory.

21. The computer-readable memory of claim 19, wherein:
the at least one device comprises a portable device that comprises another disk memory; and
the host comprises an interface to permit the portable device to be removably communicatively coupled to the host.

* * * * *